(12) United States Patent
Valpola et al.

(10) Patent No.: US 11,669,056 B2
(45) Date of Patent: Jun. 6, 2023

(54) GENERATION OF A CONTROL SYSTEM FOR A TARGET SYSTEM

(71) Applicant: CANARY CAPITAL LLC, Wilmington, DE (US)

(72) Inventors: Harri Valpola, Helsinki (FI); Eva Koppali, Espoo (FI)

(73) Assignee: CANARY CAPITAL LLC, Wilmington, DE (US)

( * ) Notice: Subject to any disclaimer, the term of this patent is extended or adjusted under 35 U.S.C. 154(b) by 435 days.

(21) Appl. No.: 16/760,591

(22) PCT Filed: Oct. 31, 2018

(86) PCT No.: PCT/FI2018/050791
§ 371 (c)(1),
(2) Date: Apr. 30, 2020

(87) PCT Pub. No.: WO2019/086760
PCT Pub. Date: May 9, 2019

(65) Prior Publication Data
US 2021/0341884 A1     Nov. 4, 2021

(30) Foreign Application Priority Data
Nov. 1, 2017 (FI) .................................... 20175970

(51) Int. Cl.
*G05B 13/02*     (2006.01)
*G05B 13/04*     (2006.01)
(Continued)

(52) U.S. Cl.
CPC ......... *G05B 13/027* (2013.01); *G05B 13/048* (2013.01); *G06N 3/045* (2023.01); *G06N 3/08* (2013.01); *G06N 3/02* (2013.01)

(58) Field of Classification Search
CPC ................................ G05B 13/027; G06N 3/02
See application file for complete search history.

(56) References Cited

U.S. PATENT DOCUMENTS

| | | | |
|---|---|---|---|
| 9,747,543 B1 | 8/2017 | Martin et al. | |
| 2010/0094788 A1* | 4/2010 | Schafer | G06N 3/048 700/29 |

(Continued)

FOREIGN PATENT DOCUMENTS

| | | |
|---|---|---|
| JP | 2010515182 A | 5/2010 |
| WO | 2017079568 A1 | 5/2017 |

OTHER PUBLICATIONS

Jensen, et al., "Inversion of Feedforward Neural Networks: Algorithms and Applications," IEEE Proceedings, 1999. (Year: 1999).*

(Continued)

*Primary Examiner* — Feng-Tzer Tzeng
(74) *Attorney, Agent, or Firm* — Craig A. Redinger

(57) ABSTRACT

The invention relates to a method for generating a control system for a target system, wherein: operational data is received; a first neural model component is trained with the received operational data for generating a prediction on a state of the target system based on the received operational data; a second neural model component is trained with the operational data for generating a regularizer for use in inverting the first neural model component; and the control system is generated by inverting the first neural model component by optimization and arranging to apply the regularizer generated with the second neural model component in the optimization. The invention relates also to a system and a computer program product.

21 Claims, 3 Drawing Sheets

(51) Int. Cl.
  *G06N 3/08*  (2023.01)
  *G06N 3/045* (2023.01)
  *G06N 3/02*  (2006.01)

(56) References Cited

U.S. PATENT DOCUMENTS

2016/0034788 A1  2/2016  Lin et al.
2017/0038750 A1  2/2017  Dull et al.
2017/0160706 A1  6/2017  Dull et al.
2017/0243111 A1  8/2017  Iyer et al.
2017/0293836 A1  10/2017 Li et al.

OTHER PUBLICATIONS

Balestriero, et al., "Semi-Supervised Learning Enabled by Multiscale Deep Neural Network Inversion," arXiv:1802.10172, 2018. (Year: 2018).*
Jensen, et al., "Inversion of Feedforward Neural Networks: Algorithms and Applications," IEEE Proceedings 1999 - see previously attached reference. (Year: 1999).*
Balestriero, et al., "Semi-Supervised Learning Enabled by Multiscale Deep Neural Network Inversion," arXiv:1802.10172, 2018—see previously attached reference. (Year: 2018).*
International Search Report and Written Opinion issued by the International Searching Authority (ISA/EP) in PCT Application No. PCT/FI2018/050791 dated Feb. 13, 2019. 10 pages.
Search Report issued by the Finnish Patent and Registration Office in Application No. FI 20175970 dated Jun. 18, 2018. 2 pages.
Weber, T., et al., "Imagination-Augmented Agents for Deep Reinforcement Learning", arXiv:1707.06203v1 [cs.LG] Jul. 19, 2017 (19 pp).

\* cited by examiner

GENERATION OF A CONTROL SYSTEM FOR A TARGET SYSTEM

CROSS-REFERENCE TO RELATED APPLICATIONS

This application is a national stage application filed under 35 U.S.C. § 371 of PCT/FI2018/050791 filed Oct. 31, 2018, which claims priority to and benefit of Finnish patent application serial number 20175970, filed Nov. 1, 2017, which is incorporated by reference and made a part hereof.

TECHNICAL FIELD

The invention concerns in general a technical field of control systems. More particularly, the invention concerns a solution for generating a control system.

BACKGROUND

Machine learning methods and lately especially neural networks and so-called "deep learning" methods are utilized widely in modern technology, for example in machine vision, pattern recognition, robotics, control systems and automation. In such applications machine learning is used in computer-implemented parts of a system or device for processing input data. As a matter of fact the area is increasingly becoming more important because different autonomously operating systems and devices are developed.

Model predictive control (MPC) methods are used in numerous control applications in robotics, control systems and automation. In MPC methods, a model of the controlled system is used to predict the system state and the effect of control signals to the system, and control signals can then be generated based on the model. However, MPC methods require a sufficiently accurate model of the target system. Such model is not necessarily available or feasible to construct, for example if the system is large and/or complex. The models may also require adjusting from time to time if the system changes, for example in case of physical parts wearing down, operating conditions changing etc.

Machine learning methods, for example artificial neural networks, can be used to generate, i.e. to construct, a model of a system based on observed input and output signals of the system. This has the advantage that a large number of systems can be modelled in this way, and the modelling can be even automatically redone completely or incrementally to keep the model up to date if the system changes.

However, even though this methodology can be used to generate a model of a system, the models constructed in this way are often unsuitable for MPC applications. This is because the models, being automatically generated, are very complex and internally noisy, non-linear mappings from input signals to output signals, and are not guaranteed to produce sensible outputs with all inputs. One specific problem is that if control actions are planned by optimizing the outcome predicted by the model, mathematical optimization methods can often find points in input space which the model predicts to have a very good outcome, but which are actually only artefacts of the model, and do not correspond to dynamics of the real world system.

Thus, there is need to develop mechanisms by means of which it is possible at least in part to mitigate the challenges in a generation of a control solutions.

SUMMARY

The following presents a simplified summary in order to provide basic understanding of some aspects of various invention embodiments. The summary is not an extensive overview of the invention. It is neither intended to identify key or critical elements of the invention nor to delineate the scope of the invention. The following summary merely presents some concepts of the invention in a simplified form as a prelude to a more detailed description of exemplifying embodiments of the invention.

An objective of the invention is to present a method for generating a control system and the control system as well as a computer program product.

The objectives of the invention are reached by a method, a system and a computer program product as defined by the respective independent claims.

According to a first aspect, a method for generating a control system for a target system is provided, the method comprising: receiving operational data of at least one source system; training a first neural model component of a neural network with the received operational data, wherein the first neural model component is trained to generate a prediction on a state of the target system based on the received operational data; training a second neural model component of the neural network with the operational data, wherein the second neural model component is trained to generate a regularizer for use in inverting the first neural model component; and generating the control system for the target system by inverting the first neural model component by optimization and arranging to apply the regularizer generated with the second neural model component in the optimization.

The second neural model component may be one of the following: a denoising neural network, a generative adversarial network, a variational autoencoder, a ladder network.

The control system may be generated by optimization by generating a policy model component configured to generate at least one control signal and optimizing parameters of the policy model component. The policy model may be implemented with one of the following: with a trained third neural model component, by optimizing parameters of a controller component belonging to the control system.

Moreover, a regularization term generated as the regularizer by the second neural model component may be an approximate density gradient of the second neural model component. The regularization term may be applied as a term in an updating of weights of the third second neural model component.

According to a second aspect, a control system for a target system is provided, the control system comprising at least one neural network, wherein the control system is configured to be generated by: receiving operational data of at least one source system; training a first neural model component of the neural network with the received operational data, wherein the first neural model component is trained to generate a prediction on a state of the target system based on the received operational data in response to an input signal; training a second neural model component of the neural network with the operational data, wherein the second neural model component is trained to generate a regularizer for use in inverting the first neural model component; and generating the control system for the target system by inverting the first neural model component by optimization and arranging to apply the regularizer generated with the second neural model component in the optimization.

The second neural model component may be one of the following: a denoising neural network, a generative adversarial network, a variational autoencoder, a ladder network.

The control system may be configured to be generated by optimization by generating a policy model component configured to generate at least one control signal and optimizing parameters of the policy model component. The policy model is implemented with one of the following: with a trained third neural model component, by optimizing parameters of a controller component belonging to the control system.

Moreover, a regularization term generated as the regularizer by the second neural model component is arranged to be an approximate density gradient of the second neural model component. The regularization term may be configured to be applied as a term in an updating of weights of the third second neural model component.

According to a third aspect, a computer program product comprising at least one computer-readable media having computer-executable program code instructions stored therein is provided for performing the method as described above when the computer program product is executed on a computer.

Various exemplifying and non-limiting embodiments of the invention both as to constructions and to methods of operation, together with additional objects and advantages thereof, will be best understood from the following description of specific exemplifying and non-limiting embodiments when read in connection with the accompanying drawings.

The verbs "to comprise" and "to include" are used in this document as open limitations that neither exclude nor require the existence of unrecited features. The features recited in dependent claims are mutually freely combinable unless otherwise explicitly stated. Furthermore, it is to be understood that the use of "a" or "an", i.e. a singular form, throughout this document does not exclude a plurality.

BRIEF DESCRIPTION OF FIGURES

The embodiments of the invention are illustrated by way of example, and not by way of limitation, in the figures of the accompanying drawings.

FIG. 1 illustrates schematically an environment in which the present invention may be applied to.

DESCRIPTION OF THE EXEMPLIFYING EMBODIMENTS

The specific examples provided in the description given below should not be construed as limiting the scope and/or the applicability of the appended claims. Lists and groups of examples provided in the description given below are not exhaustive unless otherwise explicitly stated.

The present invention improves, at least partly a generation of a control system for a target system, wherein the control system is at least partly based on a machine learning method in which so called regularization is applied in a learning phase of a neural network and used in a generation of control signals to the target system.

Figure 1:
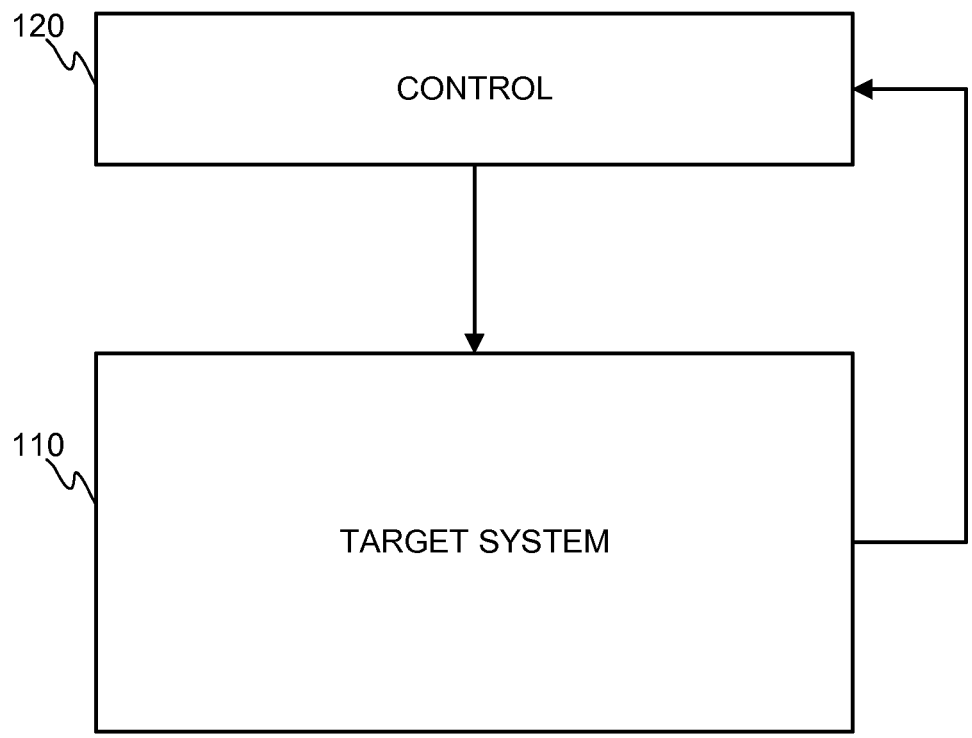

FIG. 1 illustrates schematically an environment in which the present invention may be applied to. As depicted there is a target system 110 operating under control of a control system 120. The control system 120 generates control signals to the target system 110 typically in response to information representing an operation of the system obtained from the target system 110 as a feedback loop. Some non-limiting examples of the target system 110 under control may e.g. be a chemical plant or a robot. According to the present invention the control system 120 implements a control function which is implemented with a neural network at least in part. The neural network in the control function is trained, as will be described, for controlling the target system 110.

Figure 2:
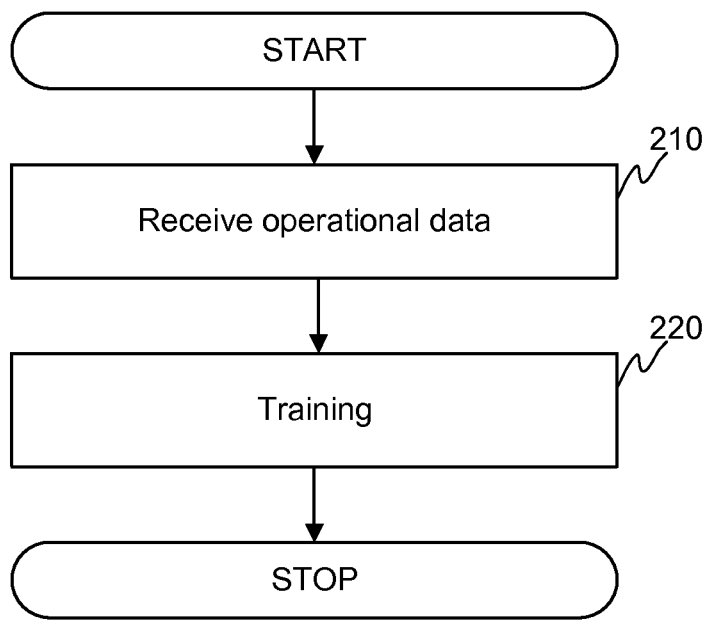
FIG. 2 illustrates schematically a method according to an embodiment of the invention.

FIG. 2 illustrates schematically an example of the method according an embodiment of the invention. In the example according to FIG. 2 a control system for controlling a target system 110 is generated, wherein the functionality of the control system is generated on a basis of operational data obtained from at least one source system. The at least one source system may be the same as the target system, or the source system may be a system, which corresponds to the target system 110 or even a computer implemented model simulating a system corresponding to the target system and the operational data is received through the simulation. In other words, the system whose operational data is used for the generation of the control function may be the same system as the target system, or functionally similar system, such as another plant or robot, or a simulator model constructed to resemble the target system 110. In the description herein the system from which the operational data used for generating rules for the controlling is taken is called for the source system. The operational data may be any data representing at least some operational aspects of the source system, which may also be used, either directly or indirectly, for generating one or more control signals to control the target system 110. In some embodiment the operational data may be history data of the source system, and it may represent a state of the source system. Some non-limiting examples of the operational data may be data may e.g. be digitized sensor values from sensors in a source system, for example temperature, pressure, flow rate, pH measurement, chemical concentrations measuring sensors or weighing sensors in a chemical processing system. The operational data may also include e.g. the input and output signal values of other controllers involved in controlling of the system, e.g. PID controller setpoints, parameters and outputs. The operational data may also include human operator entered control actions, e.g. setting values, button push actions, valve opening, keyboard or mouse actions, voice commands, steering wheel actions, foot pedal actions, etc.

In step 220 the control system 120 implemented at least in part with the neural network is trained wherein the received operational data from the at least one source system is used in the training. A neural model of the neural network may comprise a plurality of neural model components to be utilized in the training. The neural model component refers to an implementation which is achieved with a separate neural network, or to an implementation in which a plurality of neural model components is implemented by one neural network having a plurality of outputs and which is trained to perform different tasks at different instants of time.

In response to the training of the neural network the target system 110 may be controlled with the trained neural network.

Figure 3:
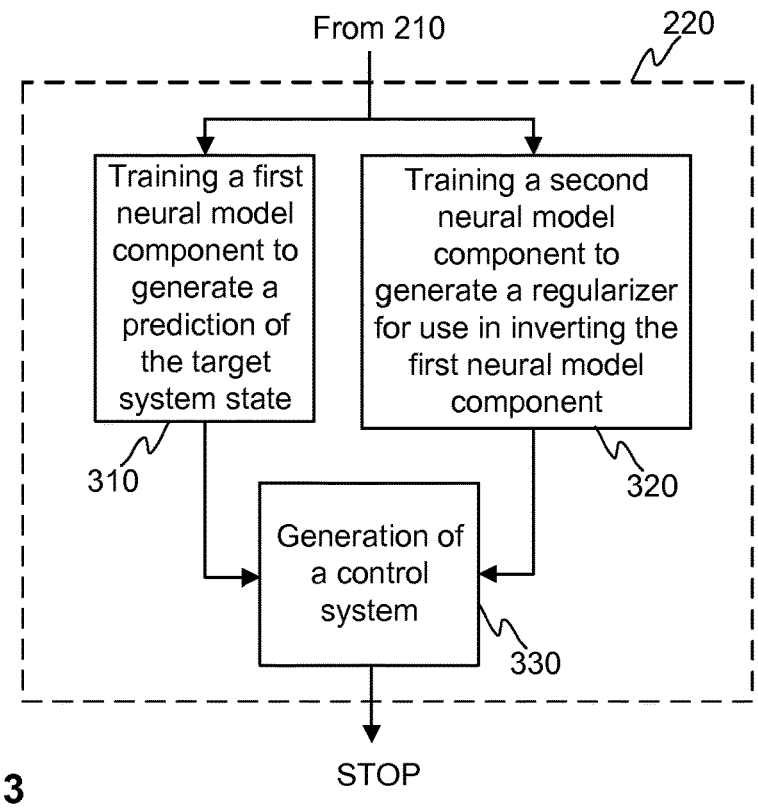
FIG. 3 illustrates schematically some further aspects of the method according to an embodiment of the invention.

The training operation of the neural network is now described in more detail by referring to FIG. 3. The FIG. 3 illustrates schematically at least some aspect with respect of the training of the neural network 220 configured to perform at least a task of controlling the target system 110. In the training of the control system 120 implemented with the neural network a prediction of the target system state is generated 310 based on the received operational data of the system. This refers to a step in which the operational data is given, as an input signal, to a first neural model component implemented in the neural network and the first neural model component is trained to generate a prediction of the target system state based on the received operational data of the source system. Further, the training phase 220 comprises a step 320 in which a second neural model component is trained to generate a regularizer for use in inverting the first neural model component. The inversion of the first neural model component refers to a procedure in which inputs or control actions to the target system that result in desired outputs or states of the target system are determined. This is done by using the first neural model component as a "forward model" to evaluate the expected effect of actions, and then optimizing the outcome. In other words, $$a = \mathrm{argmax}[V(F(x,a)) + r]$$

where
- a is a planned control signal
- x is the system state
- argmax[ ] refers to finding the argument(s) (here a) that maximises the value of a function (here V)
- V is a value ("reward") function which denotes the value that the controlling is optimizing
- F is the forward model, i.e. the first neural model component.
- r is a regularization term generated by the regularizer implemented with the second neural model component.

Solving the optimization (referred to above by argmax) problem of the value function V can be done with any suitable mathematical optimization method generally known, e.g. grid search, stochastic search, gradient descent, backpropagation or other such mathematical optimization method. Variables a and x can be numbers or categorical variables, or multidimensional vectors of values. a and x may be sequences of values, e.g. they may be a time sequence of the past. present and/or planned future actions and system state. V is a function that is used to evaluate the value of the outcome. V may include discounting predicted future values by some multiplier to weigh near-term value more than long-term value.

Regularization term r is generated by the regularizer implemented by the second neural model component G. When the second neural model component is a denoising network, for example a denoising autoencoder, the regularization term can be generated by training the second neural model component to denoise samples of the operational data (x, a). Training a network to denoise refers to a method in which the network is trained to produce a denoised or "cleaned" version of corrupted inputs:

$$\hat{x}, \hat{a} = G(\tilde{x}, \tilde{a})$$

where
- $\tilde{x}$ and $\tilde{a}$ are versions of samples of x and a which have been corrupted by adding noise, e.g. gaussian noise,
- $\hat{x}$ and $\hat{a}$ are the denoised outputs produced by the network G, which at least approximate the original input (x, a)
- G is the network which is trained to denoise samples of x and a.

The use of the regularizer can be described by the following equation:

$$r = G(x,a)$$

Use of the regularizer to generate the regularization term r alleviates the problems with model inversion described above. The regularization term, incorporated as an extra "reward" in the optimization, directs the search of the action(s) a towards values which correspond to typical and usual samples in the training data.

When the second neural component is implemented using a denoising network, training the neural model to denoise data leads to internal representations in the model that implicitly model the structure of the data manifold, i.e. an optimal denoising function corresponds to the score (derivative of the log-probability with respect to the input) of the data distribution. Using the notation above, this can be described with the equation:

$$G(\tilde{x},\tilde{a}) = (\tilde{x},\tilde{a}) + \sigma_n^2 \nabla(\tilde{x},\tilde{a}) \log p(\tilde{x},\tilde{a})$$

where $\sigma_n$ is corruption noise, log p is the log-probability, and $\nabla$ is the derivative with respect to $(\tilde{x}, \tilde{a})$. The important part is the $p(\tilde{x}, \tilde{a})$, which has a higher value if the sample $(\tilde{x}, \tilde{a})$ is a "typical" operating condition for the target system, and lower if not, hence directing the inversion towards regular and likely better solutions.

Alternatively, a generator or "policy model" may be configured to generate the control actions instead of finding the action directly:

$$\varphi = \mathrm{argmax}[V(F(x, P(x,\varphi))) + r]$$

where
- P is a "policy model", a component configured to generate the control actions (which again may be a sequence of planned control actions),
- $\varphi$ is the parameters of the policy model P (e.g. the weights of a neural network if the policy model is implemented with a neural network model).

Optimization, i.e. training, may then be done on the parameters of the policy model instead of the control actions, again using any suitable optimization method, e.g. backpropagation or another method for optimizing can used. The trained policy model is then evaluated to generate the control actions to control the target system:

$$a = P(x,\varphi)$$

The policy model P may be implemented as a third neural model, for example.

The regularizer G may also be configured to generate a regularization term in the form of an "approximate density gradient" for updating the weights of the third neural model. For example, when G is implemented with a denoising network, G(x, a) yields the approximate density gradient term $\nabla(\tilde{x}, \tilde{a}) \log p(\tilde{x}, \tilde{a})$ which can be added to the third neural model weights, optionally multiplied with a predetermined learning rate L, in the training of the model. For example, the approximate density gradient term may be solved from the equation before:

$$G(x,a) = (x,a) + \sigma_n^2 \nabla(x,a) \log p(x,a) \Leftrightarrow G(x,a) - (x,a)$$
$$= \sigma_n^2 \nabla(x,a) \log p(x,a)$$

If the approximate density gradient term is used by adding it to the weights of the third neural model, it is not necessary to evaluate explicitly, in which case the optimization of the policy model parameters can be described with the equation:

$$\varphi = \mathrm{argmax}[V(F(x, P(x,\varphi)))]$$

where the approximate density gradient term is included within the mathematical optimization (argmax) implementation, directing the training of the policy model so that it generates action(s) a which correspond to typical and usual samples in the training data. Hence the use of the regularizer to generate the regularization term in the described manner alleviates the problems with model inversion described above even if the regularization term r is not explicitly evaluated.

It is also possible to execute the described steps repeatedly, to generate a first predicted target system state and action(s), and then use the first prediction and generated action(s) as inputs to generate prediction and action(s) for a further time step, which can be repeated for a desired number of steps. Optimization, e.g. backpropagation, can be done over all the steps.

The second neural model may optionally be implemented using a denoising neural network, a variational autoencoder, a generative adversarial network (GAN), a ladder network or any other model type which models the structure of the data manifold.

In step 330, a control system is generated so that the generated regularizer in step 320 is applied together with the first neural model component. This refers to an implementation in which such actions, such as control signals, are determined which optimize a prediction from the first neural model component when the regularizing term is used for the optimization. The generation of the control system may also refer to an implementation in which a policy model component is configured for performing the task of the control system, for example by mathematically optimizing the parameters of an existing controller component, or training a third neural model component for the task of the control system. In such a situation the generation of the control system may be performed by arranging the third neural model to apply the regularizer generated with the second neural model component in the training. In other words, the control system is generated so that it may generate control actions to the target system in response to the input signals. Hence, the trained neural network may be used for controlling the target system.

As already mentioned the first neural model component and the second neural model component, as well as the third neural model component when applicable, may be implemented as separate neural networks or within one neural network configured to implement dedicated tasks, such as the one shown in FIG. 3, one at a time.

It shall be noticed that the operations disclosed in FIG. 3 and in the corresponding description are described so that the steps 310 and 320 are executed concurrently, at least in part. However, they may also be executed subsequently to each other, in any order.

Next some aspects of the second neural model component of the neural network are described. As already mentioned the aim in the training of the second neural model component is to generate a regularizer for use in inverting the first neural model component. The training of the second neural model component is advantageously performed as an unsupervised learning task and with an applicable training algorithm. An advantageous way to train the second neural model component is to train it by denoising the operational data input to the model. The second neural model component may be a so-called ladder network. Another approach is to use an autoencoder or a variational autoencoder or a generative adversarial network in the task of generating the regularizer. In the latter examples the neural model component learns the data structure so that it may be applied for the regularization task.

Regarding the generation of the control system 330 for the target system, according to an embodiment, the first neural model component may be inverted by optimization by applying the regularizing term therein. In another embodiment, the control system may be generated by inverting the first neural model component by way of stochastic search. As mentioned the generation of the control system 330 may refer to a generation of a third neural network component to perform at least part of tasks of the control system.

Further, in step 330 applying the regularizer generated with the second neural model component may e.g. refer to an implementation in which weights of the third neural model are updated with a term representing a regularization term produced by the second neural model component, which may be an approximate density gradient of the second neural model component.

In some embodiments it may be arranged that after updating the original control system, the new control system may be taken into use in controlling the target system. During the operation of the target system new data is generated and is recorded, and the learning process may be repeated. In this manner the control system may learn to control the system so that reward r is maximized, and the result of controlling may be improved.

As already discussed the second neural model component may in some embodiment be so called ladder network used for denoising. The advantage in using the ladder network is that it allows larger neural models and bigger changes in control signals. This mitigates a potential problem especially with regularization because it gets more difficult as the forward model size grows. Another problem is that low-level action regularization might limit to too small changes and stick to local minimas. It's better to regularize also on higher level.

Furthermore, in case the regularizing model is a denoising network, e.g. the ladder network as discussed, the denoising network may be trained to take in samples of the input data corrupted with added noise, and generate a cleaned, denoised version of the data. In this manner, the denoising network learns to internally represent the data; it learns about the structure in the data.

Then, the policy model may be trained, as already discussed. When the policy model is trained, the regularizing model may be used as an additional term in the calculation when the weights of the policy network are updated. The regularizing term contributes to the learning of the policy model by weighing actions and states that in a sense match with the internal representations learned by the regularizing model in the denoising task, making the policy model favor "familiar" states and controls.

In the discussion above, the denoising network and the policy model are indicated to be separate networks trained separately. However, the present invention is not limited to that only, but it may also be implemented so that the regularizing network and policy model are combined into one neural network, which is trained with both a denoising task and a policy generation task. For example, there may be two different cost functions defined, and the network may be first trained by using the denoising cost function, and then using the policy cost function. Moreover, as already mentioned the policy model implementing at least in part the function of the control system may be implemented so that by means of the policy model parameters of at least one controller component belonging to the control system are optimized according to the method as described.

Next some examples of specific application areas of the present invention are discussed. For example, the input data, i.e. the operational data, may e.g. be digitized sensor values from sensors in a process plant, for example temperature, pressure, flow rate, pH measurement, chemical concentrations measuring sensors or weighing sensors in a chemical processing system such as e.g. a distillation column. The input data may also include e.g. the input and output signal values of other controllers involved in controlling of the system, e.g. PID controller setpoints, parameters and outputs. The input data may also include actions or control signals entered by human actors, such as plant operators, e.g. setting values, button push actions, valve opening, keyboard or mouse actions, voice commands, steering wheel actions, foot pedal actions, etc.

The generation of the control system according to the invention may also be applied in other application areas than the ones mentioned above. For example, in some other application area, the input data, i.e. the operational data, may e.g. be a digital image composed of a predetermined amount of pixels having a discrete value in order to represent an original object(s) in a digital form. Alternatively, the input data may e.g. be a digital video consisting of consecutive image frames disclosing moving visual images in the form of encoded digital data. Naturally, the video may be a stored digital video or a video stream of a real-time event.

The input data may e.g. be a digital audio signal.

In a further example, the input data may e.g. be a force feedback signal, such as a strain gauge, a piezoelectric element, a pressure sensor or other hardware element that produces a feedback signal that is measured and e.g. digitized with an analog to digital converter.

In a still further example, the input data may be e.g. digital text data, such as digital text documents.

In a still further example, if the target system is e.g. a robot, the operational data may include e.g. motor control signals, voltages, currents, position measurements, pneumatic or hydraulic pressure readings, or digital camera images.

In a still further example, if the target system is e.g. a material processing plant, the operational data may include e.g. production statistics, conveyor belt speeds or positions, material level or mass measurements.

In the context of the above described non-limiting examples of the application areas the control system is configured to generate control signals to any system into which the control signals may be generated on the basis of the input data.

Figure 4:
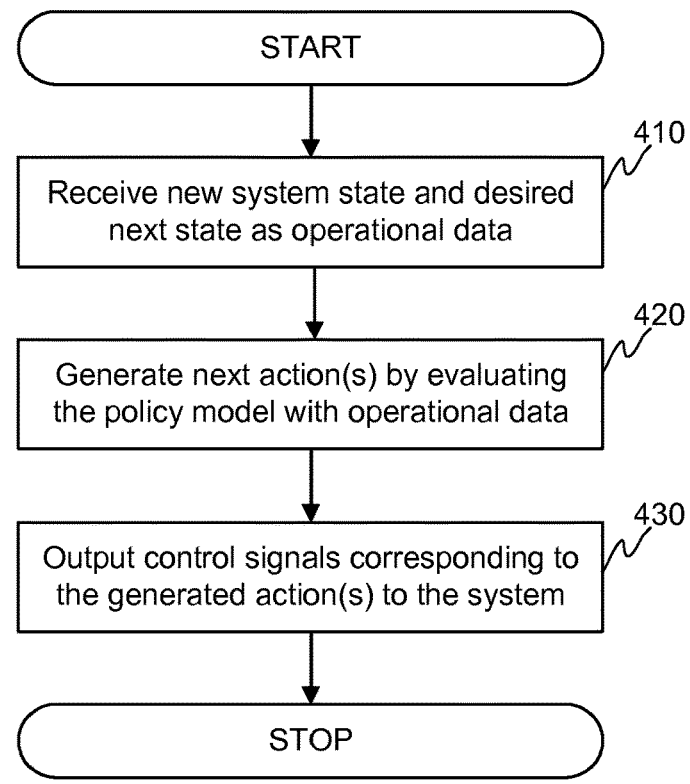
FIG. 4 illustrates schematically an example of applying a control system according to an embodiment of the invention for controlling a target system.

The present invention aims to generate a control system used for controlling a target system, such as one of those discussed above, which control system generates improved controlling for the target system. In FIG. 4 it is schematically illustrated an example of using the generated control system for controlling the target system. In step 410 information on new system state and desired new state may be received as operational data. The received information may vary from the ones mentioned above. In step 420 the system may be configured to generate one or more actions by means of the control system in operation (called as policy model in FIG. 4) in response to the receipt of the input data i.e. the operational data. The system generates the control signals 430, which correspond to the generated actions, and in that manner the target system may be controlled.

Figure 5:
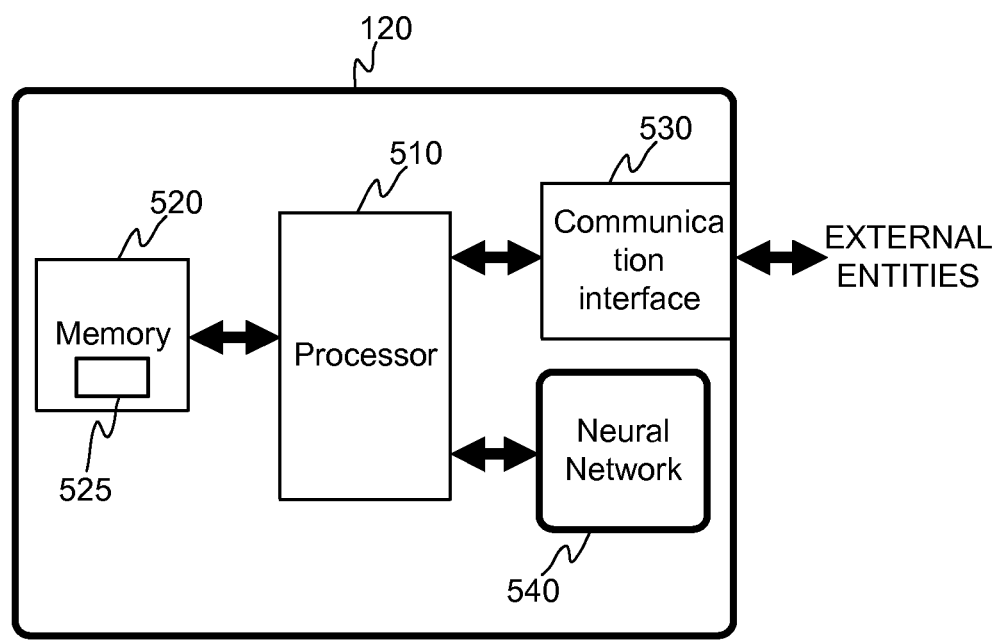
FIG. 5 illustrates schematically a control system according to an embodiment of the invention.

As already mentioned the controlling functionality may be implemented in the control system 120. The control system itself may be implemented, at least in part, with a neural network generated in the described manner configured to control the target system 110. A non-limiting example of the control system 120 is schematically illustrated in FIG. 5. The control system 120 may comprise a processing unit 510, which is configured to control an operation of the control system. The processing unit 510 may be implemented with one or more processors, or similar. The control system 120 may also comprise one or more memories 520 and one or more communication interfaces 530. The one or more memories may be configured to store computer program code 525 and any other data, which, when executed by the processing unit 510, cause the control system to operate in the manner as described. which entities may be communicatively coupled to each other with e.g. a data bus. The communication interface 530, in turn, comprises necessary hardware and software for providing an interface for external entities for transmitting signals to and from the control system 120. In the exemplifying implementation of the control system 120 of FIG. 5 comprises a neural network 540 by means of which the controlling functionality as described may be generated. In the example of FIG. 5 the control system is caused to operate under control of the processing unit 510. In some other embodiment of the present invention the neural network 540 generating the controlling functionality, at least in part, may reside in another entity than the control system 120. Furthermore, in some other embodiment the processing unit 510 is configured to implement the functionality of the neural network and there is not necessarily arranged a separate entity as the neural network. As already mentioned the first neural model component, the second neural model component and the third neural model component may be implement in the same neural network 540, or in separate neural networks configured to communicate with each other.

Furthermore, some aspects of the present invention may relate to a computer program product comprising at least one computer-readable media having computer-executable program code instructions stored therein that cause, when the computer program product is executed on a computer, the generation of the control system according to the method as described.

Generally speaking, the control system 120 may refer to a distributed computer system, a computer, a circuit or a processor in which the processing of data as described may be performed. FIG. 5 illustrates an example of the control system 120 according to an embodiment of the invention, as mentioned.

The specific examples provided in the description given above should not be construed as limiting the applicability and/or the interpretation of the appended claims. Lists and groups of examples provided in the description given above are not exhaustive unless otherwise explicitly stated.

What is claimed is:

1. A method for generating a control system for a target system, the method comprising:
   receiving operational data of at least one source system,
   training a first neural model component of a neural network with the received operational data, wherein the first neural model component is trained to generate a prediction on a state of the target system based on the received operational data,
   training a second neural model component of the neural network with the operational data, wherein the second neural model component is trained to generate a regularization term, and
   generating the control system for the target system by inverting the first neural model component by optimization, wherein the regularization term generated with the second neural model component is applied in the optimization to direct the optimization toward values that correspond to typical samples in the operational data,
   wherein generating the control system for the target system comprises using a value function in the optimization and adding the regularization term to the value function as a reward.

2. The method of claim 1, wherein the second neural model component is one of the following: a denoising neural network, a generative adversarial network, a variational autoencoder, a ladder network.

3. The method of claim 1, wherein the control system is generated by optimization by generating a policy model component configured to generate at least one control signal and optimizing parameters of the policy model component.

4. The method of claim 3, wherein the policy model is implemented with one of the following: with a trained third neural model component, by optimizing parameters of a controller component belonging to the control system.

5. A control system for a target system, the control system comprising at least one neural network, wherein the control system is configured to be generated by:
receiving operational data of at least one source system,
training a first neural model component of the neural network with the received operational data, wherein the first neural model component is trained to generate a prediction on a state of the target system based on the received operational data in response to an input signal,
training a second neural model component of the neural network with the operational data, wherein the second neural model component is trained to generate a regularization term, and
generating the control system for the target system by inverting the first neural model component by optimization, wherein the regularization term generated with the second neural model component is applied in the optimization to direct the optimization toward values that correspond to typical samples in the operational data,
wherein generating the control system for the target system comprises using a value function in the optimization and adding the regularization term to the value function as a reward.

6. The system of claim 5, wherein the second neural model component is one of the following: a denoising neural network, a generative adversarial network, a variational autoencoder, a ladder network.

7. The system of claim 5, wherein the control system is configured to be generated by optimization by generating a policy model component configured to generate at least one control signal and optimizing parameters of the policy model component.

8. The system of claim 7, wherein the policy model is implemented with one of the following: with a trained third neural model component, by optimizing parameters of a controller component belonging to the control system.

9. A non-transitory computer program product comprising at least one computer-readable media having computer-executable program code instructions stored therein, for generating a control system for a target system, wherein the computer-executable program code instructions when executed on a computer cause the computer to:
receive operational data of at least one source system,
train a first neural model component of a neural network with the received operational data, wherein the first neural model component is trained to generate a prediction on a state of the target system based on the received operational data,
train a second neural model component of the neural network with the operational data, wherein the second neural model component is trained to generate a regularization term, and
generate the control system for the target system by inverting the first neural model component by optimization, wherein the regularization term generated with the second neural model component is applied in the optimization to direct the optimization toward values that correspond to typical samples in the operational data,
wherein the instructions to generate the control system comprises instructions to use a value function in the optimization and add the regularization term to the value function as a reward.

10. The computer program product of claim 9, wherein the second neural model component is one of the following: a denoising neural network, a generative adversarial network, a variational autoencoder, a ladder network.

11. The computer program product of claim 9, wherein the control system is generated by optimization by generating a policy model component configured to generate at least one control signal and optimizing parameters of the policy model component.

12. The computer program product of claim 11, wherein the policy model is implemented with one of the following: with a trained third neural model component, by optimizing parameters of a controller component belonging to the control system.

13. The method of claim 1, wherein inverting the first neural model component refers to a procedure in which inputs or control actions to the target system that result in desired outputs or states of the target system are determined.

14. The system of claim 5, wherein inverting the first neural model component refers to a procedure in which inputs or control actions to the target system that result in desired outputs or states of the target system are determined.

15. The computer program product of claim 9, wherein inverting the first neural model component refers to a procedure in which inputs or control actions to the target system that result in desired outputs or states of the target system are determined.

16. The method of claim 1, wherein the second neural model component is trained to generate a regularization term by training the second neural model component to denoise samples of the operational data.

17. The method of claim 16, wherein the second neural model component is a denoising autoencoder.

18. The system of claim 5, wherein the second neural model component is trained to generate a regularization term by training the second neural model component to denoise samples of the operational data.

19. The system of claim 18, wherein the second neural model component is a denoising autoencoder.

20. The computer program product of claim 9, wherein the second neural model component is trained to generate a regularization term by training the second neural model component to denoise samples of the operational data.

21. The computer program product of claim 20, wherein the second neural model component is a denoising autoencoder.

* * * * *